United States Patent
Cho et al.

(10) Patent No.: US 10,411,304 B2
(45) Date of Patent: Sep. 10, 2019

(54) ELECTRODE ASSEMBLY WOUND IN BOTH DIRECTIONS AND LITHIUM SECONDARY BATTERY INCLUDING THE SAME

(71) Applicant: LG CHEM, LTD., Seoul (KR)

(72) Inventors: Won Bin Cho, Daejeon (KR); In Gu An, Daejeon (KR); Hyung Ku Yun, Daejeon (KR); Dong-Myung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 249 days.

(21) Appl. No.: 15/504,140

(22) PCT Filed: Sep. 16, 2015

(86) PCT No.: PCT/KR2015/009703
§ 371 (c)(1),
(2) Date: Feb. 15, 2017

(87) PCT Pub. No.: WO2016/056764
PCT Pub. Date: Apr. 14, 2016

(65) Prior Publication Data
US 2017/0279158 A1    Sep. 28, 2017

(30) Foreign Application Priority Data
Oct. 7, 2014  (KR) .................. 10-2014-0134776

(51) Int. Cl.
| H01M 10/0587 | (2010.01) |
| H01M 10/04 | (2006.01) |
| H01M 10/0525 | (2010.01) |
| H01M 10/058 | (2010.01) |
| H01M 10/052 | (2010.01) |
| H01M 4/02 | (2006.01) |

(52) U.S. Cl.
CPC ... *H01M 10/0587* (2013.01); *H01M 10/0431* (2013.01); *H01M 10/0468* (2013.01); *H01M 10/052* (2013.01); *H01M 10/058* (2013.01); *H01M 10/0525* (2013.01); *H01M 2004/027* (2013.01); *H01M 2004/028* (2013.01); *Y02E 60/122* (2013.01); *Y02P 70/54* (2015.11); *Y02T 10/7011* (2013.01)

(58) Field of Classification Search
CPC ............. H01M 10/04; H01M 10/0404; H01M 10/0409; H01M 10/0418; H01M 10/0431; H01M 10/045; H01M 10/0454; H01M 10/0459; H01M 10/0468; H01M 10/052; H01M 10/0525; H01M 10/058; H01M 10/0583; H01M 10/0587; H01M 10/14; H01M 2004/027; H01M 2004/028; Y02P 70/54; Y02E 60/122; Y02T 10/7011
See application file for complete search history.

(56) References Cited

U.S. PATENT DOCUMENTS

| 8,741,469 B2 | 6/2014 | Ahn et al. | |
| 2008/0280208 A1 | 11/2008 | Naoi et al. | |
| 2009/0305121 A1* | 12/2009 | Yoon ................. | H01M 10/0431 429/94 |
| 2010/0015511 A1* | 1/2010 | Yoo ....................... | H01M 2/202 429/94 |
| 2010/0279161 A1 | 11/2010 | Kang et al. | |
| 2014/0057147 A1* | 2/2014 | Andrew ............ | H01M 10/0431 429/94 |
| 2014/0072850 A1* | 3/2014 | Kwon ............... | H01M 10/0463 429/94 |
| 2014/0255739 A1* | 9/2014 | Maleki .............. | H01M 10/0431 429/94 |
| 2015/0050553 A1* | 2/2015 | Lin ........................ | H01G 11/26 429/211 |

FOREIGN PATENT DOCUMENTS

| CN | 102683742 A | 9/2012 |
| CN | 205122703 U | 3/2016 |
| EP | 3168918 A1 | 5/2017 |
| KR | 10-2006-0122344 A | 11/2006 |
| KR | 10-2007-0114412 A | 12/2007 |
| KR | 10-2009-0008075 A | 1/2009 |
| KR | 10-2011-0058657 A | 6/2011 |
| KR | 10-2012-0117306 A | 10/2012 |
| KR | 10-2013-0095371 A | 8/2013 |
| KR | 10-2014-0035646 A | 3/2014 |
| WO | WO 2014/042424 A1 | 3/2014 |

OTHER PUBLICATIONS

International Search Report (PCT/ISA/210) issued in PCT/KR2015/009703, dated Dec. 14, 2015.
European Search Report for Appl. No. 15848708.2 dated Dec. 4, 2017.

* cited by examiner

*Primary Examiner* — Anca Eoff
(74) *Attorney, Agent, or Firm* — Mintz Levin Cohn Ferris Glovsky and Popeo, P.C.; Kongsik Kim; Jhongwoo Jay Peck

(57) ABSTRACT

An electrode assembly includes a plurality of unit cells, each including a positive electrode, a negative electrode, and a separator disposed therebetween, and a single separation sheet disposed between the unit cells while surrounding side surfaces thereof. First and second stack parts of unit cells are wound with the separation sheet from each end of the separation sheet toward the middle of the separation sheet, a facing unit cell has one surface that contacts the first stack part with the separation sheet between the one surface of the facing unit cell and the first stack part and the other surface that contacts the second stack part with the separation sheet between the other surface of the facing unit cell and the second stack part, and the unit cells are stacked such that electrodes having opposite polarities are disposed in contact with each other with the separation sheet therebetween.

22 Claims, 3 Drawing Sheets

[FIG. 1]
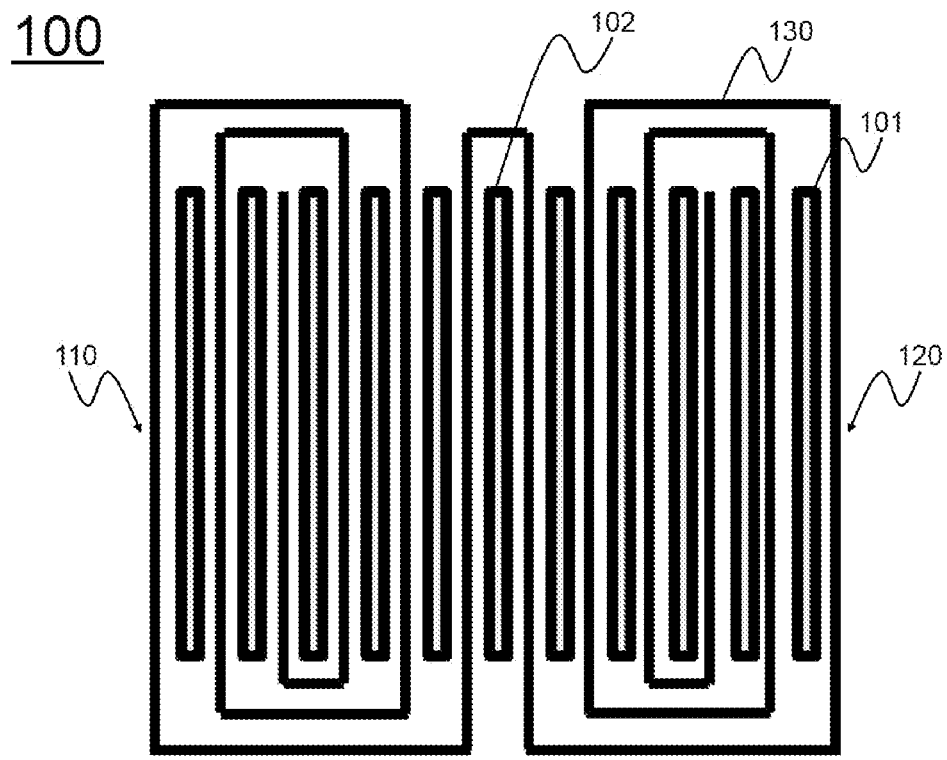
[FIG. 2]
C-typed bi-cell
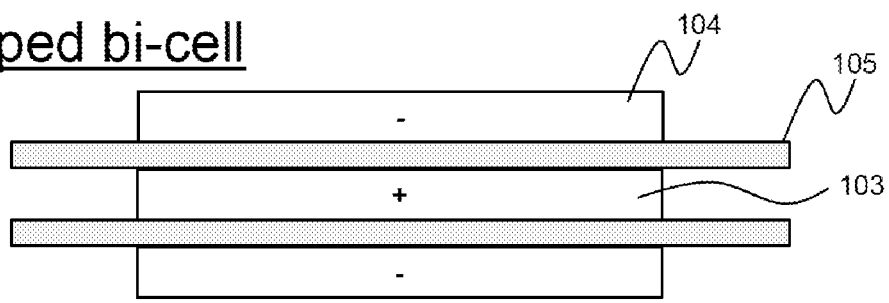

[FIG. 3]
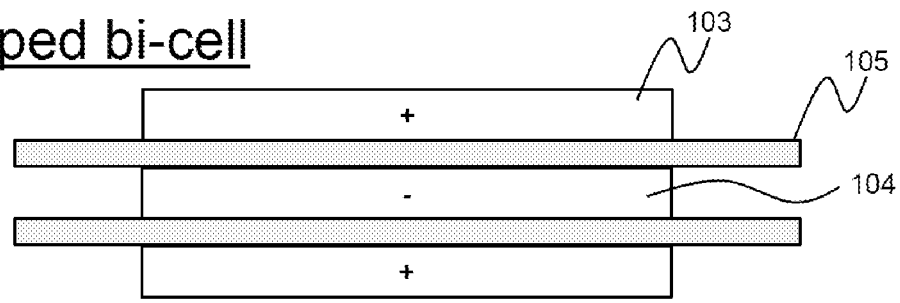
[FIG. 4]
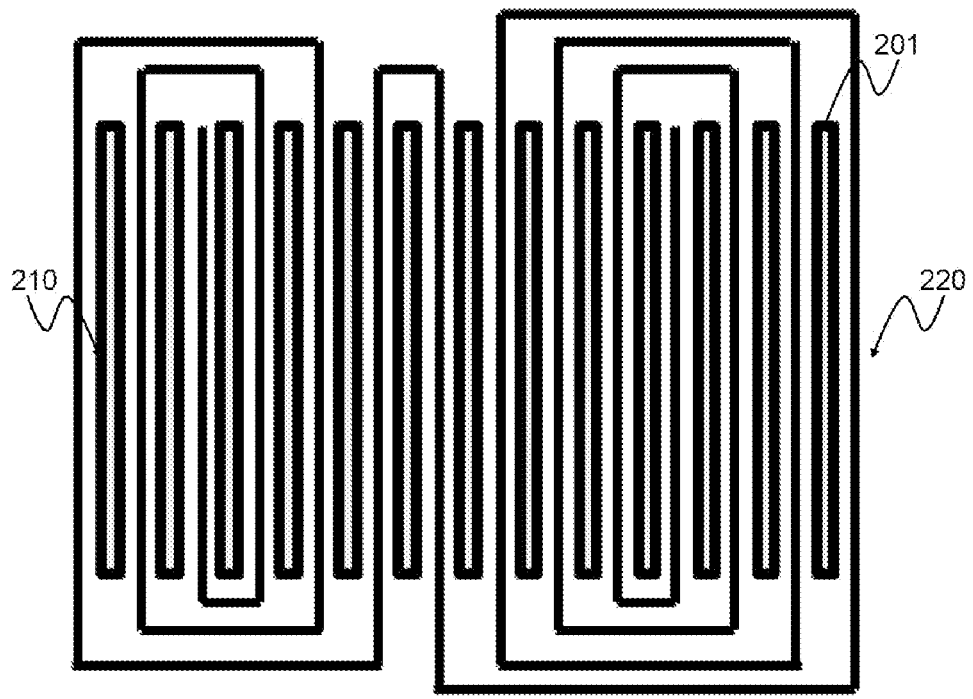

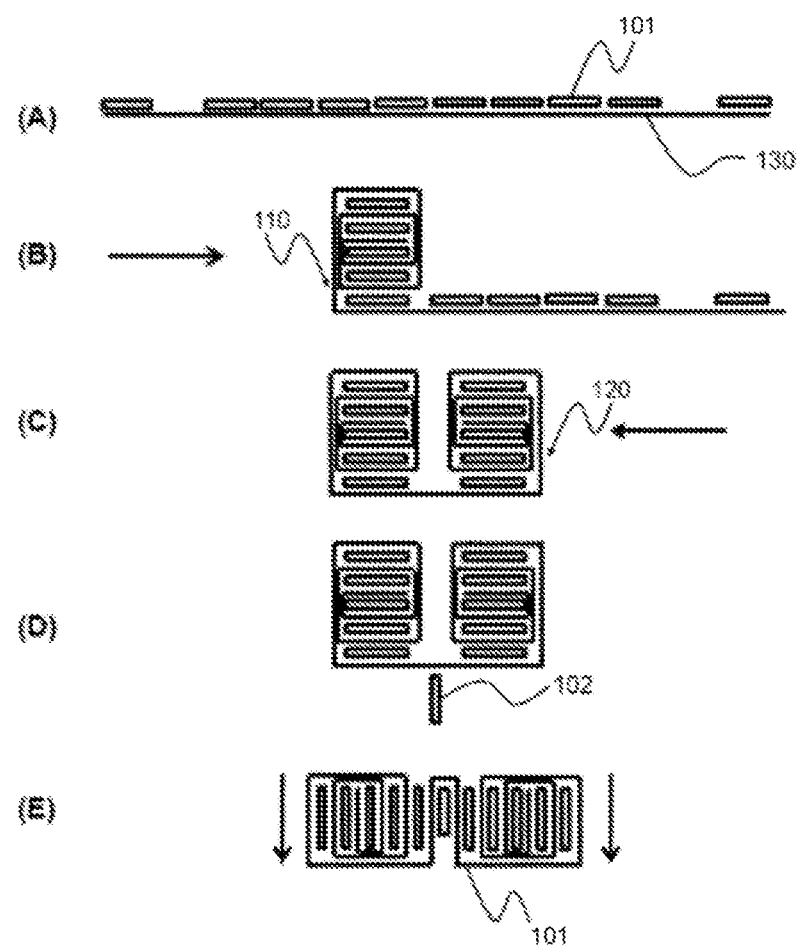
[FIG. 5]

ELECTRODE ASSEMBLY WOUND IN BOTH DIRECTIONS AND LITHIUM SECONDARY BATTERY INCLUDING THE SAME

CROSS-REFERENCE TO RELATED APPLICATIONS

This application claims the benefit of Korean Patent Application No. 10-2014-0134776 filed on Oct. 7, 2014 with the Korean Intellectual Property Office, the disclosure of which is herein incorporated by reference in its entirety.

TECHNICAL FIELD

The present invention relates to an electrode assembly wound in both directions and a lithium secondary battery including the same.

BACKGROUND ART

As energy prices increase due to the depletion of fossil fuels and interest in environmental pollution escalates, the demand for environmentally-friendly alternative energy sources is bound to increase in the future. In particular, the demand for small-sized, high-capacity secondary batteries is increasing in response to trends toward multifunction, high performance, and miniaturization of mobile devices.

In terms of the shape of batteries, the demand for prismatic secondary batteries or pouch-shaped secondary batteries, which are thin enough to be applied to products such as mobile phones, is very high. In terms of the material for batteries, on the other hand, the demand for lithium secondary batteries, such as lithium ion batteries and lithium ion polymer batteries, which exhibit high energy density, discharge voltage, and output stability, is very high.

In addition, secondary batteries may be classified based on the structure of an electrode assembly configured to have a structure in which a positive electrode, a separator, and a negative electrode are sequentially arranged. Typically, the electrode assembly may be configured to have a jelly-roll (wound) type structure in which a long sheet type positive electrode and a long sheet type negative electrode are wound in the state in which a separator is disposed between the positive electrode and the negative electrode or a stacked type structure in which pluralities of positive electrodes and negative electrodes each having a predetermined size are sequentially stacked in the state in which separators are disposed respectively between the positive electrodes and the negative electrodes.

However, the above-mentioned conventional electrode assemblies have the following problems.

First, the jelly-roll type electrode assembly is prepared by winding a long sheet type positive electrode and a long sheet type negative electrode in a dense state such that the jelly-roll type electrode assembly has a circular or oval structure in section. As a result, stress, caused by expansion and contraction of the electrodes during charging and discharging of a battery, may accumulate in the electrode assembly and, when the accumulated level of stress exceeds a specific limit, the electrode assembly may be deformed. The deformation of the electrode assembly results in non-uniformity of a gap between the electrodes. As a result, the performance of the battery may be abruptly deteriorated and the safety of the battery may not be secured due to the generation of a short circuit in the battery. In addition, it is difficult to rapidly wind the long sheet type positive electrode and the long sheet type negative electrode while maintaining a uniform gap between the positive electrode and negative electrode, with the result that productivity is lowered.

Secondly, the stacked type electrode assembly is prepared by sequentially stacking a plurality of unit positive electrodes and a plurality of unit negative electrodes. For this reason, it is necessary to additionally perform a process for transferring electrode plates which are used to prepare the unit positive electrodes and the unit negative electrodes. In addition, large amounts of time and effort are required to perform the sequential stacking process, with the result that productivity is lowered.

In order to solve the above-mentioned problems, there has been developed a stacked/folded type electrode assembly having an improved structure, which is a combination of the jelly-roll type electrode assembly and the stacked type electrode assembly. The stacked/folded type electrode assembly is configured to have a structure in which pluralities of positive electrodes and negative electrodes having a predetermined size are stacked in the state in which separators are disposed respectively between the positive electrodes and the negative electrodes so as to constitute a bi-cell or a full-cell and then a plurality of bi-cells or a plurality of full-cells is folded using a long separator sheet. The details of the stacked/folded type electrode assembly are disclosed in Korean Patent Application Publication No. 2001-0082058, No. 2001-0082059, and No. 2001-0082060, which have been filed in the name of the applicant of the present patent application.

However, the stacked/folded type electrode assembly is manufactured by winding a plurality of bi-cells or full cells in one direction. As the number of bi-cells or full cells that are stacked is increased, the number of times that the separator sheet is overlapped is increased, with the result that the overall width of the electrode assembly is increased. In addition, as the number of times that the bi-cells or full cells are wound is increased, the likelihood of snaking is increased.

Therefore, there is a high necessity for technology that is capable of minimizing the increase in overall width of the electrode assembly, even when the number of bi-cells or full cells that are stacked is increased, and of preventing the occurrence of snaking at the time of winding the bi-cells or the full cells.

DISCLOSURE

Technical Problem

The present invention has been made to solve the above problems and other technical problems that have yet to be resolved.

Specifically, an object of the present invention is to provide a stacked/folded type electrode assembly configured such that it is possible to minimize the increase in width of the electrode assembly even when the number of unit cells that are stacked is increased and to prevent the occurrence of snaking even when the number of winds is increased at the time of winding the unit cells.

Technical Solution

In accordance with one aspect of the present invention, the above and other objects can be accomplished by the provision of an electrode assembly including a plurality of unit cells, each of which is configured to have a structure including a positive electrode, a negative electrode, and a separator disposed between the positive electrode and the negative electrode, and a single separation sheet disposed between the unit cells while surrounding side surfaces of the unit cells, wherein the unit cells include unit cells wound together with the separation sheet from one end of the separation sheet toward the middle of the separation sheet to constitute a first stack part, unit cells wound together with the separation sheet from the other end of the separation sheet toward the middle of the separation sheet to constitute a second stack part, and a facing unit cell having one surface that contacts the first stack part in the state in which the separation sheet is disposed between the one surface of the facing unit cell and the first stack part and the other surface that contacts the second stack part in the state in which the separation sheet is disposed between the other surface of the facing unit cell and the second stack part, and the unit cells are stacked such that electrodes having opposite polarities are disposed in contact with each other in the state in which the separation sheet is disposed between the respective electrodes.

In the electrode assembly according to the present invention, therefore, the unit cells include unit cells wound together with the separation sheet from one end of the separation sheet toward the middle of the separation sheet to constitute a first stack part and unit cells wound together with the separation sheet from the other end of the separation sheet toward the middle of the separation sheet to constitute a second stack part. Consequently, it is possible to minimize the increase in width of the electrode assembly even when the number of unit cells that are stacked is increased and to prevent the occurrence of snaking even when the number of winds is increased at the time of winding the unit cells, compared to an electrode assembly configured such that unit cells are wound in one direction.

Here, the width of the electrode assembly may mean the length of each of the unit cells in the longitudinal direction.

As an example of the electrodes, the positive electrode may have a positive electrode slurry layer formed on a positive electrode current collector, and the negative electrode may have a negative electrode slurry layer formed on a negative electrode current collector.

Specifically, the positive electrode may have a positive electrode slurry layer formed on each surface of a positive electrode current collector, and the negative electrode may have a negative electrode slurry layer formed on each surface of a negative electrode current collector.

On the other hand, ones of the unit cells that are located at specific regions of the electrode assembly, i.e. the outermost ones of the unit cells, may be configured such that a positive electrode constituting the outer surface of the electrode assembly has a positive electrode slurry layer formed on only one surface of a positive electrode current collector and such that a negative electrode constituting the outer surface of the electrode assembly has a negative electrode slurry layer formed on only one surface of a negative electrode current collector.

As an example of the structural relationship between the first stack part and the second stack part, the number of unit cells constituting the first stack part may be 0.5 times to 1.5 times the number of unit cells constituting the second stack part.

Specifically, the number of unit cells constituting the first stack part may be equal to the number of unit cells constituting the second stack part.

As an example of the wound structure of the first stack part and the second stack part, the unit cells of the first stack part and the second stack part may be wound in the state in which the unit cells are disposed in contact with one surface of the separation sheet.

Specifically, the unit cells of the first stack part may be wound in a first direction, and the unit cells of the second stack part may be wound in a second direction, which is opposite the first direction.

As an example of the facing unit cell, the facing unit cell may be disposed in contact with the other surface of the separation sheet, which is opposite the surface of the separation sheet with which the unit cells of the first stack part and the second stack part are disposed in contact.

Specifically, the facing unit cell is disposed between a unit cell (a), which is a finally wound unit cell of the first stack part, and a unit cell (b), which is a finally wound unit cell of the second stack part, while the separation sheet is disposed between the facing unit cell and the unit cell (a) and the separation sheet is disposed between the facing unit cell and the unit cell (b) in the state in which the first stack part and the second stack part are disposed such that the unit cell (a) and the unit cell (b) face each other.

More specifically, the first stack part may be bent perpendicularly from the wound end of the first stack part in a second direction and the second stack part may be bent perpendicularly from the wound end of the second stack part in a first direction such that the unit cell (a) and the unit cell (b) face each other.

The facing unit cell may be a C-type bi-cell, configured to have a basic structure in which a negative electrode, a separator, a positive electrode, a separator, and a negative electrode are sequentially arranged, and each of the unit cell (a) and the unit cell (b) may be an A-type bi-cell, configured to have a basic structure in which a positive electrode, a separator, a negative electrode, a separator, and a positive electrode are sequentially arranged. On the other hand, the facing unit cell may be an A-type bi-cell, and each of the unit cell (a) and the unit cell (b) may be a C-type bi-cell.

Each of a unit cell (a-1) of the first stack part adjacent to the unit cell (a) and a unit cell (b-1) of the second stack part adjacent to the unit cell (b) may be configured such that an electrode constituting an outer surface of the electrode assembly has an electrode mixture coated on one surface thereof.

The separator or the separation film having micropores may be selected from the group consisting of a polyethylene film, a polypropylene film, a multi-layered film manufactured from a combination of the polyethylene film and the polypropylene film, and a polymer film for a polymer electrolyte, such as polyvinylidene fluoride, polyethylene oxide, polyacrylonitrile, or polyvinylidene fluoride-co-hexafluoropropylene.

In accordance with another aspect of the present invention, there is provided a lithium secondary battery having the electrode assembly mounted in a battery case, the electrode assembly being impregnated with an electrolytic solution, the battery case being sealed.

In accordance with another aspect of the present invention, there is provided a battery module including the lithium secondary battery as a unit cell.

In accordance with another aspect of the present invention, there is provided a device including the battery module as a power source.

The device may be selected from among an electric vehicle, a hybrid electric vehicle, a plug-in hybrid electric vehicle, and a power storage apparatus. The structure and manufacturing method of the device are well known in the art to which the present invention pertains, and a detailed description thereof will be omitted.

In accordance with a further aspect of the present invention, there is provided a method of manufacturing the electrode assembly, the method including (a) manufacturing a plurality of unit cells, each of which is configured to have a structure including a positive electrode, a negative electrode, and a separator disposed between the positive electrode and the negative electrode, (b) arranging the unit cells on the upper surface of a single separation sheet, (c) winding some of the unit cells together with the separation sheet from one end of the separation sheet toward the middle of the separation sheet to constitute a first stack part, (d) winding some of the unit cells together with the separation sheet from the other end of the separation sheet toward the middle of the separation sheet to constitute a second stack part, (e) locating a facing unit cell at a middle portion of the lower surface of the separation sheet, and (f) bending the first stack part and the second stack part toward the facing unit cell such that one surface of the facing unit cell is in contact with the first stack part and the other surface of the facing unit cell is in contact with the second stack part.

Specifically, ones of the unit cells that are located at the outermost ends of the electrode assembly when the unit cells are wound after being arranged at step (b) may be configured such that a positive electrode constituting the outer surface of the electrode assembly has a positive electrode slurry layer formed on only one surface of a positive electrode current collector and such that a negative electrode constituting the outer surface of the electrode assembly has a negative electrode slurry layer formed on only one surface of a negative electrode current collector.

In addition, the number of unit cells that constitute the first stack part at step (c) may be 0.5 times to 1.5 times the number of unit cells that constitute the second stack part at step (d).

The facing unit cell, located at step (e), may be a C-type bi-cell, configured to have a basic structure in which a negative electrode, a separator, a positive electrode, a separator, and a negative electrode are sequentially arranged. Alternatively, the facing unit cell may be an A-type bi-cell, configured to have a basic structure in which a positive electrode, a separator, a negative electrode, a separator, and a positive electrode are sequentially arranged.

BRIEF DESCRIPTION OF DRAWINGS

The above and other objects, features and other advantages of the present invention will be more clearly understood from the following detailed description taken in conjunction with the accompanying drawings, in which:

FIG. 1 is a side view showing an electrode assembly according to an embodiment of the present invention;

FIG. 2 is a side view showing a facing unit cell of FIG. 1;

FIG. 3 is a side view showing a unit cell disposed in contact with the facing unit cell of FIG. 2;

FIG. 4 is a side view showing an electrode assembly according to another embodiment of the present invention; and FIG. 5 is a schematic view showing a method of manufacturing the electrode assembly of FIG. 1.

BEST MODE

Now, exemplary embodiments of the present invention will be described in detail with reference to the accompanying drawings. It should be noted, however, that the scope of the present invention is not limited by the illustrated embodiments.

FIG. 1 is a side view showing an electrode assembly according to an embodiment of the present invention, FIG. 2 is a side view showing a facing unit cell of FIG. 1, and FIG. 3 is a side view showing a unit cell disposed in contact with the facing unit cell of FIG. 2.

Referring to FIG. 1 together with FIGS. 2 and 3, an electrode assembly 100 includes unit cells and a separation sheet 130. Some of the unit cells 101 are wound together with the separation sheet 130 from the left end of the separation sheet 130 to constitute a first stack part 110, and some of the unit cells 101 are wound together with the separation sheet 130 from the right end of the separation sheet 130 to constitute a second stack part 120.

In addition, a facing unit cell 102 is disposed at the middle of the electrode assembly 100 such that the facing unit cell 102 faces the first stack part 110 and the second stack part 120.

The unit cells 101 are stacked such that electrodes having opposite polarities are disposed in contact with each other in the state in which the separation sheet 130 is disposed between the respective electrodes.

The facing unit cell 102 is a C-type bi-cell, which is configured to have a structure in which negative electrodes 104 are located at the upper end and the lower end of the unit cell, a positive electrode 103 is located at the middle of the unit cell, and a separator 105 is disposed between each of the negative electrodes 104 and the positive electrode 103.

In addition, each of the unit cells 101 that are disposed in contact with the facing unit cell 102 is an A-type bi-cell, which is configured to have a structure in which positive electrodes 103 are located at the upper end and the lower end of the unit cell, a negative electrode 104 is located at the middle of the unit cell, and a separator 105 is disposed between each of the positive electrodes 103 and the negative electrode 104.

In addition, the outermost ones of the unit cells 101 are configured such that a positive electrode constituting the outer surface of the electrode assembly 100 has a positive electrode slurry layer formed on only one surface of a positive electrode current collector and such that a negative electrode constituting the outer surface of the electrode assembly 100 has a negative electrode slurry layer formed on only one surface of a negative electrode current collector.

The number of unit cells 101 constituting the first stack part 110 is equal to the number of unit cells 101 constituting the second stack part 120.

FIG. 4 is a side view showing an electrode assembly according to another embodiment of the present invention.

Referring to FIG. 4, the number of unit cells 201 constituting a first stack part 210 is 0.7 times the number of unit cells 201 constituting a second stack part 220. The structure of the electrode assembly, except for the numbers of unit cells 201 constituting the stack parts 210 and 220, is identical to that of the electrode assembly according to the embodiment shown in FIGS. 1 to 3, and therefore a detailed description thereof will be omitted.

FIG. 5 is a schematic view showing a method of manufacturing the electrode assembly of FIG. 1.

Referring to FIG. 5, at step (a), unit cells 101 are arranged on a separation sheet 130.

At step (b), some of the unit cells 101 are wound together with the separation sheet 130 from the left end of the separation sheet 130 in the direction indicated by the arrow to constitute a first stack part 110.

At step (c), some of the unit cells 101 are wound together with the separation sheet 130 from the right end of the separation sheet 130 in the direction indicated by the arrow to constitute a second stack part 120.

At step (d), a facing unit cell 102 is located at the middle of the lower surface of the separation sheet 130.

At step (e), the first stack part 110 and the second stack part 120 are bent in the direction indicated by the arrow such that the first stack part 110 and the second stack part 120 are disposed in contact with the facing unit cell 102 to manufacture an electrode assembly 100.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in the electrode assembly according to the present invention, it is possible to minimize the increase in width of the electrode assembly even when the number of unit cells that are stacked is increased and to prevent the occurrence of snaking even when the number of winds is increased at the time of winding the unit cells.

The invention claimed is:

1. An electrode assembly comprising:
a plurality of unit cells, each of which is configured to have a structure comprising a positive electrode, a negative electrode, and a separator disposed between the positive electrode and the negative electrode; and
a single separation sheet disposed between the unit cells while surrounding side surfaces of the unit cells, wherein
the unit cells comprise unit cells wound together with the separation sheet from one end of the separation sheet toward a middle of the separation sheet to constitute a first stack part, unit cells wound together with the separation sheet from the other end of the separation sheet toward the middle of the separation sheet to constitute a second stack part, and a facing unit cell having one surface that contacts the first stack part in a state in which the separation sheet is disposed between the one surface of the facing unit cell and the first stack part and the other surface that contacts the second stack part in a state in which the separation sheet is disposed between the other surface of the facing unit cell and the second stack part, and
the unit cells are stacked such that electrodes having opposite polarities are disposed in contact with each other in a state in which the separation sheet is disposed between the respective electrodes.

2. The electrode assembly according to claim 1, wherein the positive electrode has a positive electrode slurry layer formed on a positive electrode current collector, and the negative electrode has a negative electrode slurry layer formed on a negative electrode current collector.

3. The electrode assembly according to claim 2, wherein outermost ones of the unit cells are configured such that a positive electrode constituting an outer surface of the electrode assembly has a positive electrode slurry layer formed on only one surface of a positive electrode current collector and such that a negative electrode constituting the outer surface of the electrode assembly has a negative electrode slurry layer formed on only one surface of a negative electrode current collector.

4. The electrode assembly according to claim 1, wherein a number of unit cells constituting the first stack part is 0.5 times to 1.5 times a number of unit cells constituting the second stack part.

5. The electrode assembly according to claim 1, wherein a number of unit cells constituting the first stack part is equal to a number of unit cells constituting the second stack part.

6. The electrode assembly according to claim 1, wherein the unit cells of the first stack part and the second stack part are wound from a state in which the unit cells are disposed on one surface of the separation sheet.

7. The electrode assembly according to claim 6, wherein the unit cells of the first stack part are wound in a first direction, and the unit cells of the second stack part are wound in a second direction, which is opposite the first direction.

8. The electrode assembly according to claim 6, wherein the facing unit cell is disposed in contact with the other surface of the separation sheet, which is opposite the surface of the separation sheet with which the unit cells of the first stack part and the second stack part are disposed in contact.

9. The electrode assembly according to claim 8, wherein the facing unit cell is disposed between a unit cell (a), which is a finally wound unit cell of the first stack part, and a unit cell (b), which is a finally wound unit cell of the second stack part, while the separation sheet is disposed between the facing unit cell and the unit cell (a) and the separation sheet is disposed between the facing unit cell and the unit cell (b) in a state in which the first stack part and the second stack part are disposed such that the unit cell (a) and the unit cell (b) face each other.

10. The electrode assembly according to claim 9, wherein the first stack part is bent perpendicularly from a wound end of the first stack part in a second direction and the second stack part is bent perpendicularly from a wound end of the second stack part in a first direction such that the unit cell (a) and the unit cell (b) face each other.

11. The electrode assembly according to claim 10, wherein the facing unit cell is a C-type bi-cell, configured to have a basic structure in which a negative electrode, a separator, a positive electrode, a separator, and a negative electrode are sequentially arranged.

12. The electrode assembly according to claim 10, wherein each of the unit cell (a) and the unit cell (b) is an A-type bi-cell, configured to have a basic structure in which a positive electrode, a separator, a negative electrode, a separator, and a positive electrode are sequentially arranged.

13. The electrode assembly according to claim 10, wherein each of a unit cell (a-1) of the first stack part adjacent to the unit cell (a) and a unit cell (b-1) of the second stack part adjacent to the unit cell (b) is configured such that an electrode constituting an outer surface of the electrode assembly has an electrode mixture coated on one surface thereof.

14. The electrode assembly according to claim 1, wherein the separator or the separation sheet is selected from a group consisting of a polyethylene film, a polypropylene film, a multi-layered film manufactured from a combination of the polyethylene film and the polypropylene film, and a polymer film for a polymer electrolyte.

15. A lithium secondary battery having the electrode assembly according to claim 1 mounted in a battery case, the electrode assembly being impregnated with an electrolytic solution, the battery case being sealed.

16. A battery module comprising the lithium secondary battery according to claim 15 as a unit cell.

17. A device comprising the battery module according to claim 16 as a power source.

18. The device according to claim 17, wherein the device is an electric vehicle, a hybrid electric vehicle, a plug-in hybrid electric vehicle, or a power storage apparatus.

19. A method of manufacturing the electrode assembly according to claim 1, the method comprising:
   (a) manufacturing a plurality of unit cells, each of which is configured to have a structure comprising a positive electrode, a negative electrode, and a separator disposed between the positive electrode and the negative electrode;
   (b) arranging the unit cells on an upper surface of a single separation sheet;
   (c) winding some of the unit cells together with the separation sheet from one end of the separation sheet toward a middle of the separation sheet to constitute a first stack part;
   (d) winding some of the unit cells together with the separation sheet from the other end of the separation sheet toward the middle of the separation sheet to constitute a second stack part;
   (e) locating a facing unit cell at a middle portion of a lower surface of the separation sheet; and
   (f) bending the first stack part and the second stack part toward the facing unit cell such that one surface of the facing unit cell is in contact with the first stack part and the other surface of the facing unit cell is in contact with the second stack part.

20. The method according to claim 19, wherein ones of the unit cells that are located at outermost ends of the electrode assembly when the unit cells are wound after being arranged at step (b) are configured such that a positive electrode constituting an outer surface of the electrode assembly has a positive electrode slurry layer formed on only one surface of a positive electrode current collector and such that a negative electrode constituting the outer surface of the electrode assembly has a negative electrode slurry layer formed on only one surface of a negative electrode current collector.

21. The method according to claim 19, wherein a number of unit cells that constitute the first stack part at step (c) is 0.5 times to 1.5 times a number of unit cells that constitute the second stack part at step (d).

22. The method according to claim 19, wherein the facing unit cell, located at step (e), is a C-type bi-cell, configured to have a basic structure in which a negative electrode, a separator, a positive electrode, a separator, and a negative electrode are sequentially arranged.

* * * * *